June 15, 1926.
W. F. HENDRY
DRY CELL
Original Filed Nov. 8, 1923
1,588,726
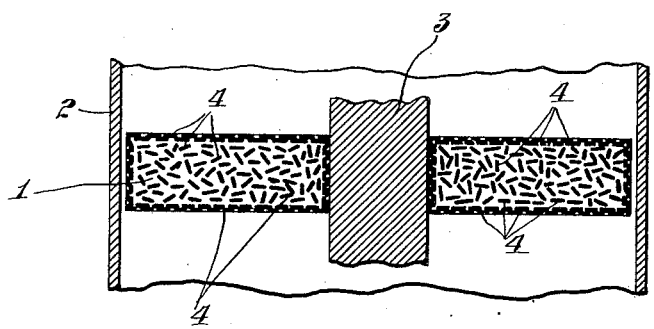
INVENTOR
W. F. Hendry
BY
his ATTORNEY Patented June 15, 1926.

1,588,726

UNITED STATES PATENT OFFICE.

WILLIAM F. HENDRY, OF OSSINING, NEW YORK, ASSIGNOR, BY MESNE ASSIGNMENTS, TO NATIONAL CARBON COMPANY, INC., NEW YORK, N. Y., A CORPORATION OF NEW YORK.

DRY CELL.

Original application filed November 8, 1923, Serial No. 673,539. Divided and this application filed September 18, 1924. Serial No. 738,456.

This invention relates to dry cells and more particularly to a new and useful manner of preparing the depolarizing mix for dry cells. The present is a division of application Serial No. 673,539, filed November 8, 1923.

It is the object of the present invention to provide an improved dry cell mix in which flaked carbonaceous material, e. g., graphite, is used in a new and improved manner, together with a suitable depolarizer such as manganese dioxid.

As is well known in the art, it is customary to mix finely ground coke or graphite or other carbonaceous material with the manganese dioxid for the reason that the latter is relatively a non-conductor and the carbonaceous material introduced will provide a path for the current between the two poles of the battery. The finer the carbonaceous material is ground, the better it coats the particles of depolarizing material, but this fineness introduces innumerable contacts with consequent increase in resistance. To overcome this difficulty to some extent, it has been common practice to introduce a quantity of natural graphite in flake form. These flakes being approximately $\frac{1}{16}''$ in diameter, bridge over innumerable contacts between the particles of fine graphite, providing the plane of the flake is parallel with the direction of current flow, thus reducing the electrical resistance in the same manner that a sheet of lead would reduce the electrical resistance of a mass of birdshot.

In the conventional form of dry cell, the mixture surrounding the carbon electrode is tamped or squeezed into one compact mass substantially the dimensions of the interior of the zinc container electrode and it is obvious that with this method no control whatsoever can be exercised over the position of the flakes or flake graphite in the mix in relation to the direction of current flow. Those which happen to lie with their longest dimension parallel to the flow of current will aid in reducing the resistance, but all others will have little or no beneficial effect.

The novel feature of my invention consists of a method of construction whereby a much greater proportion of the flakes are caused to assume the position with their greatest dimension parallel to the direction of current flow and this is accomplished by squeezing the mix in the form of flat tablets or washers, the thickness of which bears a definite relation to the longest dimension of the graphite flakes. It is perfectly obvious that if a quantity of a mixture containing manganese dioxid, fine graphite and graphite flakes, approximately $\frac{1}{16}''$ in diameter, was compressed to a thickness of $\frac{1}{32}''$, all of the graphite flakes would lie flat, and a dry battery made of an assembly of such washers around the carbon electrode, would have a much lower resistance than one made of the same mix tamped in the conventional manner. It is evident that the turning over of these flakes takes place at the surfaces against which the pressure is applied, and therefore if the application of pressure was discontinued before the mass was reduced to a thickness less than the longest dimension of the flake, a condition would result where all flakes adjacent to the surfaces against which the pressure had been applied would be turned flatwise, but those flakes in the middle of the washer would be in random positions, as in the case of ordinary batteries.

From this it is evident that the benefit to be derived from this construction is a function of the pressure applied and as there are practical limits to the density permissible in a dry cell mix, the practical definition of my invention would be a specification setting forth the relation between the thickness of the washer and the longest dimension of the flake.

The drawings represent in cross section an enlarged and exaggerated view of a portion of a dry cell constructed in accordance with the present invention.

In accordance with the preferred embodiment of the present invention, the cell is composed of relatively thin washers like 1, provided within a zinc can 2 and surrounding a carbon electrode 3. The washers 1 are made of manganese dioxid, powdered graphite and flaked graphite 4 placed under a very high pressure. The manganese dioxid and powdered graphite are represented by the blank spaces within washer 1. The graphite will lie flat at substantially right angles to the longitudinal axes of the two electrodes 2 and 3 at those points of the mix where the pressure is applied, i. e., the lower and upper surfaces of the washer 1. Structures composed of similar washers are described and claimed in my copending application Serial No. 654,611, filed July 30, 1923. By subjecting these washers to very high pressures, a plurality of substantially straight and continuous layers of flaked graphite will be formed. The flakes in adjacent layers will in all probability overlap each other, thus affording a straight low resistance path for the electrical current from the carbon electrode 3 to the zinc electrode 2. I find that improved results are obtained when the thickness of these washers is even as much as six times the diameter of the flakes, though of course, the best results are obtained with a much smaller ratio.

One of the advantages attained by the present invention is that as compared with the structure disclosed in my said application, it will not be necessary to apply a coating of graphite to the surfaces of the washers, the layers of graphite above referred to serving in the place of such coatings.

What I claim is:

1. The method of constructing tablets for dry cells which consists in mixing depolarizing material with conducting material, a portion of said conducting material being in the form of flakes, and then subjecting the mixture to relatively high pressure.

2. The method of constructing dry cells which consists in first mixing depolarizing material with carbonaceous material, at least a portion of which is in the form of flakes, and then subjecting the mixture to high pressure.

In testimony whereof I have signed my name to this specification this 17th day of September, 1924.

WILLIAM F. HENDRY.